United States Patent [19]

Armanet

[11] 4,123,801
[45] Oct. 31, 1978

[54] POT-TYPE MALAXATOR

[75] Inventor: Pierre Armanet, Rueil-Malmaison, France

[73] Assignee: Societe Moritz, Chatou, France

[21] Appl. No.: 773,184

[22] Filed: Mar. 1, 1977

[30] Foreign Application Priority Data

Mar. 3, 1976 [FR] France .................................. 76 06025

[51] Int. Cl.² ............................................. B01F 7/00
[52] U.S. Cl. ..................................... 366/292; 366/312
[58] Field of Search ............... 259/41, 42, 43, 6, 103, 259/107, 107, 108, 7, 5, 21, 22, 40, 102, 119; 366/292

[56] References Cited

U.S. PATENT DOCUMENTS

| 989,468 | 4/1911 | Youlten | 259/103 |
| 2,703,304 | 3/1955 | Paladino | 259/106 |
| 3,155,376 | 11/1964 | Mollenbruck | 259/108 |
| 3,201,095 | 8/1965 | Erwien | 259/108 |
| 3,804,304 | 4/1974 | Richter | 259/41 |

Primary Examiner—Robert W. Jenkins
Attorney, Agent, or Firm—Marn & Jangarathis

[57] ABSTRACT

A pot-type malaxator for forming a pasty mass from a material being treated having movable agitator means mounted for rotation about an axis which is inclined at an angle of from 5° to 30° to the vertical to leave the bottom of the pot clear for a discharge opening. The agitator sweeps a solid angle of from 130° to 190° of the pot and high speed disperser means in the form of a turbine is located in the pot in an equatorial zone thereof.

4 Claims, 1 Drawing Figure

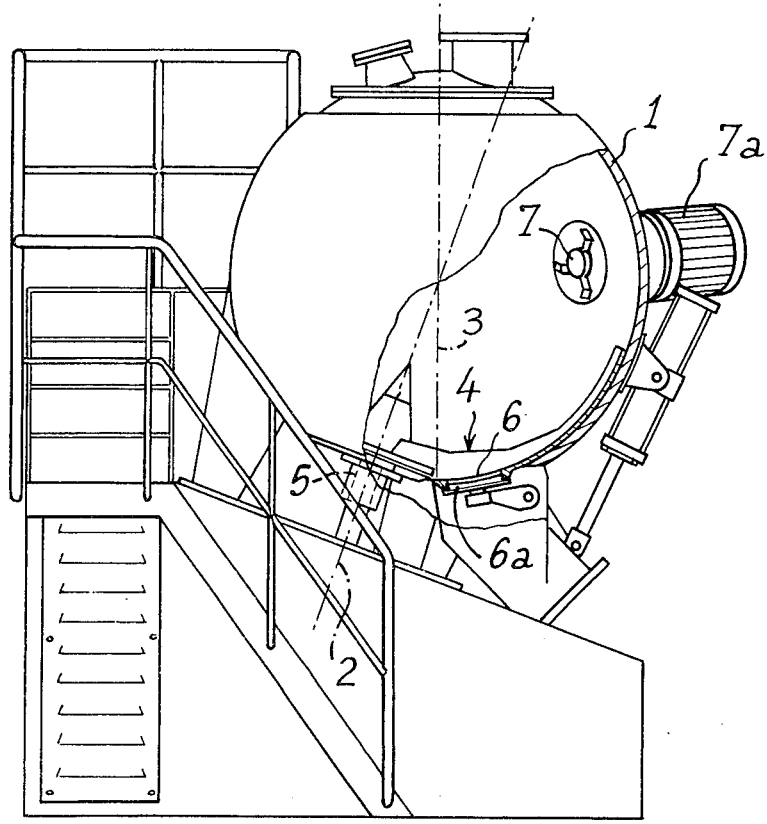

POT-TYPE MALAXATOR

FIELD OF THE INVENTION

The present invention relates a malaxator for forming a pasty mass from a material being treated, and more particularly to a pot-type malaxator of which at least the lower part is in the shape of a solid of revolution, the malaxator being of the type comprising a movable agitator member having at least two arms driven so as to rotate about an axis which is substantially radial relative to the lower part of the pot, each arm having an edge which conforms to the internal contour of the pot in the said lower part of the said pot.

In the malaxators of this type, the movable agitator has the function of creating a central suction effect and a peripheral folding over effect of the materials along the arms of the said movable member and then along the walls of the pot.

PRIOR ART

In the known malaxators of this type, the axis of rotation of the movable member is vertical, which in particular has the disadvantage of necessitating driving the said movable member by a shaft located above the movable member, so as to leave the bottom of the pot free in order to provide a discharge orifice therein.

It is an object of the present invention to overcome these disadvantages.

It is a further object to propose a malaxator in which the malaxating action on materials is improved.

BRIEF SUMMARY OF THE INVENTION

According to the invention, the axis of rotation of the movable agitator means is inclined relative to the vertical, at an angle which is preferably between 5° and 30°.

Thus, this inclined arrangement of the axis of rotation of the movable agitator means makes it possible to drive the said movable agitator means by means of a shaft mounted below the movable agitator member, without encumbering the bottom of the pot, and to provide a discharge orifice at the bottom of the pot.

Furthermore, this inclined arrangement makes it possible to set up in the pot a vortex which is no longer simply a vortex of revolution and in which the paths of the materials are longer and intersect one another as in a kneader.

This results in a better malaxating effect and, if the apparatus is also used as a dryer, in more rapid and more complete drying of the materials.

Furthermore, this inclined arrangement of the axis of the movable agitator means makes it possible to place the disperser means in the equatorial zone of the pot, which was not possible in the prior art malaxators where the path of the arms of the movable agitator means extended into the said equatorial zone; thus the malaxator of this invention provides better feed of the said disperser by the vortex.

Advantageously, the pot is in the form of a complete sphere.

Thus, by virtue of the completely spherical shape of the pot, the materials thus forced outwardly by the arms of the agitator means continue to follow the wall of the pot beyond the equatorial zone and remain sticking to the said wall because of centrifugal force. Above this equatorial zone, where centrifugal force falls off, the materials drop back onto the bottom of the pot. Regardless of the weight of the materials they will thus always drop back towards the bottom of the pot and thus be recycled. The completely spherical shape of the pot thus makes it possible to avoid the separation of materials of different densities by centrifuging effect.

PREFERRED EMBODIMENT

Further objects and advantages of the present invention will become apparent on reading the description of one embodiment which now follows, with reference to the accompanying drawing, in which: the single FIGURE represents a partially opened elevation view of a malaxator according to an embodiment of the invention.

The drawing shows a malaxator/dryer apparatus comprising a completely spherical pot 1 in which is positioned a movable agitator member 4 comprising two arms each having an edge which closely follows (with a clearance of 3 mm) the internal contour of the pot 1. The agitator member 4 is in the lower part of the pot and, is able to rotate about an axis 2 which extends radially relative to the pot 1 and is inclined at 18° to the vertical diameter 3 of the pot.

The movable agitator member 4 sweeps an area which extends over a solid angle of about 180° of the pot and is driven rotationally be means of a drive shaft 5 which is located below the movable agitator member 4 and passes through the pot 1 in a leaktight manner, with the aid of sealing means of conventional form.

Thus, the inclined arrangement of the axis of rotation 2 of the agitator member 4 leaves the bottom of the pot 1 free to accommodate a discharge orifice 6 closed by a pneumatically controlled closure flap 6a.

Furthermore, this inclined arrangement of the axis 2 leaves a part of the equatorial zone of the sphere 1 free and in this part there is provided a movable disperser means, in this case a high-speed dispersion turbine 7 driven rotationally by the motor 7a and serving to break up agglomerated structures present in the materials and to disperse them.

Arranged in this way, the movable disperser means 7 is better fed with materials than if it were located in the upper cap of the pot 1.

A noteworthy application of this type of movable member combined with a spherical, elliptical or biconical shape of pot is the production of reactor-dryers having the following characteristics:

(a) the apparatus, which can have a conical or elliptical pot but preferably has a spherical pot, is designed to be able to function under vacuum or under pressure; and (b) the pot is equipped with a double heating jacket over the maximum available surface of the pot. This apparatus is hereinafter referred to as a reactor vessel.

The movable agitator member 4 referred to above is driven by means of the shaft 5 which passes through the bottom of the pot 1 with the aid of suitable sealing means (in this case a double mechanical packing). The shaft 5 is rotated by means of an assembly comprising a motor and a variable speed reduction gear of a motor and a reduction gear with at least two speeds.

The working procedure of the reactor vessel is as follows:

1st stage: the materials to be reacted, being liquid, fluid or pasty, are introduced into the pot 1, to be brought into intimate contact by the action of the movable agitator member 4 until the desired reaction under the desired control conditions (in respect of temperature, modulated speeds of rotation, working time and the like) is achieved.

2nd stage: phase transfer operations can be concluded, for example by displacing an aqueous phase by a solvent phase in a high viscosity medium, in which case the movable member 4 operates as a tool for malaxating at a suitable speed (in principle, a lower speed).

3rd stage: the actual drying operation is now carried out, the apparatus now being subjected to vacuum, with the movable member working first as a malaxating tool and then as a wall scraper.

As the drying proceeds, the amount of product diminishes whilst continuing to be thrown along the walls in progressively thinner layers, so that at the end of the operation thin film evaporation is definitely occurring.

In this way, progressively drier crusts are finally obtained, but the circulation movement along the walls never ceases until the material has been converted to a powder.

4th stage: finally there is obtained a heterogeneous structure in the form of flakes or of agglomerates, the particle size of which has to be homogenised.

The movable agitator member 4, carried at high speed, now behaves as a genuine disintegrator and makes it possible to obtain accurately a powder of homogeneous particle size, with a fineness which depends on the nature of the product and can be considerable and comparable to that obtainable by a pass through a finishing grinder.

This process thus makes it possible to produce, in a single perfectly leakproof apparatus, and in a programmed manufacturing cycle, a series of component operations which are normally completed in 3 or 4 separate apparatuses of different principles arranged in cascade, with the necessity of handling the products during transfer from one apparatus to the next in the cascade.

Without departing from the scope of the invention those skilled in the art will envisage various modifications which can be introduced to the above described devices and processes which have just been given solely by way of a non-limiting example.

I claim:

1. A malaxator for forming a pasty mass from a material being treated which comprises:
    a pot including a bottom and having a spherically-shaped interior surface mounted on a vertical axis;
    a first agitator means disposed in said bottom of said pot proximate to said vertical axis and including at least two arms, said first agitator means having an axis of rotation inclined to the vertical axis of said pot, said arms having an edge conforming to said spherically-shaped interior surface;
    means for driving said agitator means;
    a second agitator means disposed in an equatorial zone of said pot in a portion thereof outside a sweep area of said arms of said first agitator means to cause said material to follow said surface of said pot above said equatorial zone;
    a discharge opening disposed in said bottom of said pot proximate to said vertical axis of said pot;
    a closure flap for closing said discharge opening; and
    means for closing said closure flap during operative cycling of said malaxator.

2. A pot-type malaxator according to claim 1, wherein said axis of rotation of the agitator means is inclined at an angle which is from 5° to 30°.

3. A malaxator according to claim 1, wherein said agitator means is constructed to sweep a solid angle of from 130° to 190° of said pot.

4. A malaxator according to claim 1, wherein said second agitator means is driven by a high speed motor.

* * * * *